United States Patent
Wakumoto et al.

(10) Patent No.: US 7,623,533 B2
(45) Date of Patent: Nov. 24, 2009

(54) SWITCH MESHING USING MULTIPLE DIRECTIONAL SPANNING TREES

(75) Inventors: Shaun K. Wakumoto, Roseville, CA (US); Ballard C. Bare, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 565 days.

(21) Appl. No.: 11/250,663

(22) Filed: Oct. 14, 2005

(65) Prior Publication Data

US 2007/0086363 A1    Apr. 19, 2007

(51) Int. Cl.
 *H04L 12/28* (2006.01)
(52) U.S. Cl. .................... 370/406; 370/256
(58) Field of Classification Search ............. None
See application file for complete search history.

(56) References Cited

U.S. PATENT DOCUMENTS

| | | | | |
|---|---|---|---|---|
| 7,126,921 | B2 * | 10/2006 | Mark et al. | 370/242 |
| 7,428,213 | B2 * | 9/2008 | Vasseur et al. | 370/228 |
| 7,466,661 | B1 * | 12/2008 | Previdi et al. | 370/254 |
| 2002/0093954 | A1 * | 7/2002 | Weil et al. | 370/389 |
| 2004/0062195 | A1 * | 4/2004 | Mishra et al. | 370/217 |
| 2005/0152333 | A1 * | 7/2005 | Smith | 370/351 |
| 2005/0213582 | A1 * | 9/2005 | Wakumoto et al. | 370/395.3 |
| 2005/0276217 | A1 * | 12/2005 | Gadgil et al. | 370/225 |
| 2005/0276251 | A1 * | 12/2005 | Biddiscombe et al. | 370/338 |
| 2006/0245424 | A1 * | 11/2006 | Ramanathan et al. | 370/389 |
| 2008/0043635 | A1 * | 2/2008 | Retana et al. | 370/252 |

OTHER PUBLICATIONS

Wakumoto et al., "Directed Cost Protocol," U.S. Appl. No. 10/812,260, filed Mar. 29, 2004.
Wakumoto, et al., "Directing a Path Verification Request Along a Specific Path to a Mesh Network Switch to Test Operability of the Specific Path," U.S. Appl. No. 10/850,226, filed May 20, 2004.
Wakumoto et al., "Determination of a Plurality of Paths Before Selection of One Path of the Plurality of Paths for Transmission of One or More Packets," U.S. Appl. No. 10/850,334, filed May 20, 2004.
Wakumoto et al., "Switching Mesh with Broadcast Path Redundancy," U.S. Appl. No. 10/767,236, filed Jan. 28, 2005.

* cited by examiner

*Primary Examiner*—Phirin Sam

(57) ABSTRACT

In a packet-based switch, a method for managing data flow between the switch and other switches that are interconnected in a mesh network. The method includes receiving at the switch a topology inform packet sent from a first switch of the other switches. The topology inform packet includes at least an identifier of the first switch. The method also includes updating a link state database associated with the first switch. The link state database is configured for storing topology data pertaining to the mesh network. The method further includes forwarding the topology inform packet to at least another switch of the other switches to enable at least another switch to update a link state database associated with at least another switch.

22 Claims, 6 Drawing Sheets

SWITCH MESHING USING MULTIPLE DIRECTIONAL SPANNING TREES

CROSS-REFERENCE TO RELATED APPLICATIONS

This application contains subject matter that is related to the subject matter of the following applications, which are assigned to the same assignee as this application. The below-listed applications are hereby incorporated herein by reference:

"Directed Cost Protocol," by Wakumoto et al., application Ser. No. 10/812,260 filed on Mar. 29, 2004.

"Directing a Path Verification Request Along a Specific Path to a Mesh Network Switch to Test Operability of the Specific Path," by Wakumoto, et al., application Ser. No. 10/850,226 filed on May 20, 2004.

"Determination of a Plurality of Paths Before Selection of One Path of the Plurality of Paths for Transmission of One or More Packets," by Wakumoto et al., application Ser. No. 10/850,334 filed on May 20, 2004.

"Switching Mesh with Broadcast Path Redundancy," by Wakumoto et al., application Ser. No. 10/767,236 filed on Jan. 28, 2005.

BACKGROUND OF THE INVENTION

Progress in technology combined with lowering cost have proliferated the exchange of electronic data. Modern society's needs to share electronic information have abetted in the propagation of a plurality of networks. The ability to transmit information swiftly through a network may be facilitated by the network topology.

As discussed herein, a topology refers to an arrangement by which switches may be organized to direct data packet traffic through a network. In a packet-based network, information exchanged on the network tends to be sent as data packets. An example of a popular network topology is a mesh topology.

As discussed herein, mesh topology refers to a network arrangement in which each switch may be connected to at least one other switch. During a given time (e.g., recalculation period), mesh topology may have one best path for the new Media Access Control (MAC) addresses of a given destination switch. However, MAC addresses that may have already been assigned paths may continue to receive data packets through these paths until the paths becomes invalid (e.g., links may be broken, cost measurements significantly changed, etc.). Since switches may be interconnected, each switch may be able to re-route a data packet if a link in a path is broken. As discussed herein, a link refers to a connection between two switches.

To facilitate discussion, FIG. 1 shows a simple diagram of a mesh network. Mesh network 100 may include a plurality of switches (102, 104, 106, and 108) which may be interconnected with one another. In other words, each switch may have a plurality of available paths from which data packets may be sent to or received from other switches on the network. In addition, each switch may have a plurality of ports from which data packets may be sent to other switches. In this diagram, switch 102 may have three ports (A, B, and C), switch 104 may have three ports (D, E, and F), switch 106 may have three ports (G, H, and I), and switch 108 may have three ports (J, K, and L). Also, attached to each switch may be a plurality of devices (e.g., computers, printers, scanners, etc.). In an example, devices 110 and 112 may be attached to switch 102, and a device 114 may be attached to switch 106. Note that each device may have a unique MAC address that may identify the device to the network.

Although a number of paths may be available to route a data packet for new MAC addresses of a given destination switch through the mesh network, only one path to a destination switch (i.e., the switch that is the final recipient of a data packet) may be active at a given time for the use of assigning MAC addresses to the destination switch. The determination of a path for a new MAC address of a destination switch may be based on a cost protocol process that may be continuously performed during each recalculation period (e.g., a pre-determined time interval that may be, for example, about every 30 seconds). During the recalculation period, switches may exchange cost protocol packets with one another.

As discussed herein, a cost protocol packet refers to a data packet that may include cost information about each of the switches in a specific path. In addition to cost information, cost protocol packet may also include other data (e.g., number of hops, security access, etc.) that a switch may use in determining the best path for each destination switch during a recalculation period. Given the dynamic nature of a mesh network (e.g., a link between two switches may have been broken, a new switch may have been introduced into the network, and/or new MAC addresses may have changed the cost of a link), the best available path during the next recalculation period may change.

TABLE 1

Examples of Available Paths for Switch 104

| No. | Path | description | Type |
|---|---|---|---|
| 1 | Switch 104-->switch 102 | Port D switch 104 to port C switch 102 | link 1 |
| 2 | Switch 104-->switch 108-->switch 102 | Port E switch 104 to port K switch 108 | link 1 |
|   |   | Port L switch 108 to port A switch 102 | link 2 |
| 3 | Switch 104-->switch 106-->switch 108-->switch 102 | Port F switch 104 to port G switch 106 | link 1 |
|   |   | Port I switch 106 to port J switch 108 | link 2 |
|   |   | Port L switch 108 to port A switch 102 | link 3 |

Consider the situation wherein, for example, switch 104 wants to determine the best possible path to switch 102 (see table 1 above for available paths). In the first path (i.e., switch 104 to switch 102), switch 104 may receive a cost protocol packet from switch 102 with information about the inbound cost of receiving a data packet via port C by switch 102. Upon receiving the cost protocol packet, switch 104 may add its outbound cost associated with sending a packet to switch 102 via port D. Switch 104 now has the total cost of sending a packet to switch 102 using the first path.

Similarly, the same method may be used to calculate the total cost associated with the second path. First, switch 102 may send out a cost protocol packet to switch 108 with information about the inbound cost of receiving a data packet via port A by switch 102. Upon receiving the cost protocol packet, switch 108 may add its outbound cost associated with sending a packet via port L to switch 102. Then switch 108 may add the cost of receiving a data packet via port K and forward the total cost to switch 104. Upon receiving the cost protocol packets, switch 104 may add its outbound cost associated with sending a packet to switch 108 via port E.

Using the method described above, the switches in the mesh network may calculate the cost associated with each available path. However, as costs of available paths are recalculated, the mesh network may be flooded with cost protocol packets. Generally, during the cost protocol calculations, all available paths may be traversed. Each of the switches may exchange cost protocol packets to test the performance of each path, to determine the speed of each path, to determine the number of switches that may be traversed in a path, etc. Thus, a large amount of bandwidth may be dedicated to cost protocol traffic during every recalculation period. Further, the cost associated with recalculating cost protocol may grow exponentially as the size of the network increases Based on the cost protocol calculation, each switch may be able to determine the best path to a destination switch. In an example, if switch 104 determines that the best path to switch 102 is via the second path (i.e., switch 104→switch 108→switch 102) then each data packet originated by switch 104 may be forwarded to switch 102 by traversing through switches 104 and 108 before arriving at switch 102.

For paths with three or more switches (e.g., second and third paths in Table 1), each switch in the path may be unaware of the entire path. In other words, each switch may only be able to detect the links with its neighboring switches. In the example above, switch 104 may only be able to discern the link between it and switch 108. Switch 104 may be ignorant of the link between switch 108 and 102. Further, if the link between switch 108 and 102 is broken, switch 104 may continue to send data packets along this path, since switch 104 may be unaware of the broken link. Accordingly, switch 108 may have the burden of re-routing data packets it received from switch 104 for switch 102 until a new path may be established at the next recalculation period.

Further, with mesh topology, newly added devices to the network between each recalculation period tend to be associated with the current best path as identified by the switch. In an example, if switch 102 learns 10 new MAC addresses, then switch 104 may designate the second path (i.e., switch 104→switch 108→switch 102) as the best available path to these 10 new MAC addresses. Consequently, this second path may now become congested with the additional traffic from the additional MAC addresses. However, since switch 104 may only be aware of one best available path at a given time, switch 104 may be unable to perform load balancing (i.e., distributing packet traffic between available paths). Also, if the link between 108 and 102 is broken, switch 104 may continue to forward data packets to switch 108 since switch 104 may be unaware of the broken link. Thus, switch 108 may now have the additional burden of handling traffics for the additional 10 new MAC addresses.

There are several disadvantages associated with the prior art mesh topology. For example, since each switch does not have a complete topology of the network, the ability for each switch to respond to changing conditions may be hindered. Also, with limited knowledge of the network, the switches may be unable to perform load balancing as new devices are removed/attached to the network. Further, the network's performance may suffer during each recalculation period as the network may be flooded with a multitude of cost protocol packets.

SUMMARY OF INVENTION

The invention relates, in an embodiment, in a packet-based switch, a method for managing data flow between the switch and other switches that are interconnected in a mesh network. The method includes receiving at the switch a topology inform packet sent from a first switch of the other switches. The topology inform packet includes at least an identifier of the first switch. The method also includes updating a link state database associated with the first switch. The link state database is configured for storing topology data pertaining to the mesh network. The method further includes forwarding the topology inform packet to at least another switch of the other switches to enable at least another switch to update a link state database associated with at least another switch.

In yet another embodiment, the invention relates to a method for managing data flow between a plurality of switches in a packet-based network. The plurality of switches is interconnected in a mesh topology. The method includes sending, using a first switch, a topology inform packet that includes at least an identifier of the first switch. The method also includes updating, using data in the topology inform packet, a link state databases associated with respective ones of the plurality of switches. The method further includes creating reverse spanning trees utilizing the link state databases, a reverse spanning tree associated with a given switch of the plurality of switches being created with the given switch being designated a destination switch and configured to provide information pertaining to a plurality of possible paths to the given switch from another switch of the plurality of switches.

In yet another embodiment, the invention relates to an article of manufacture comprising a program storage medium having computer readable code embodied therein. The computer readable code is configured for managing data flow between a switch and other switches that are interconnected in a mesh network. The article includes computer readable code for receiving at the switch a topology inform packet sent from a first switch of the other switches. The topology inform packet includes at least an identifier of the first switch. The article also includes computer readable code for updating a link state database associated with the first switch. The link state database is configured for storing topology data pertaining to the mesh network. The article further includes computer readable code for forwarding the topology inform packet to at least another switch of the other switches to enable at least another switch to update a link state database associated with at least another switch.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

Figure 1:
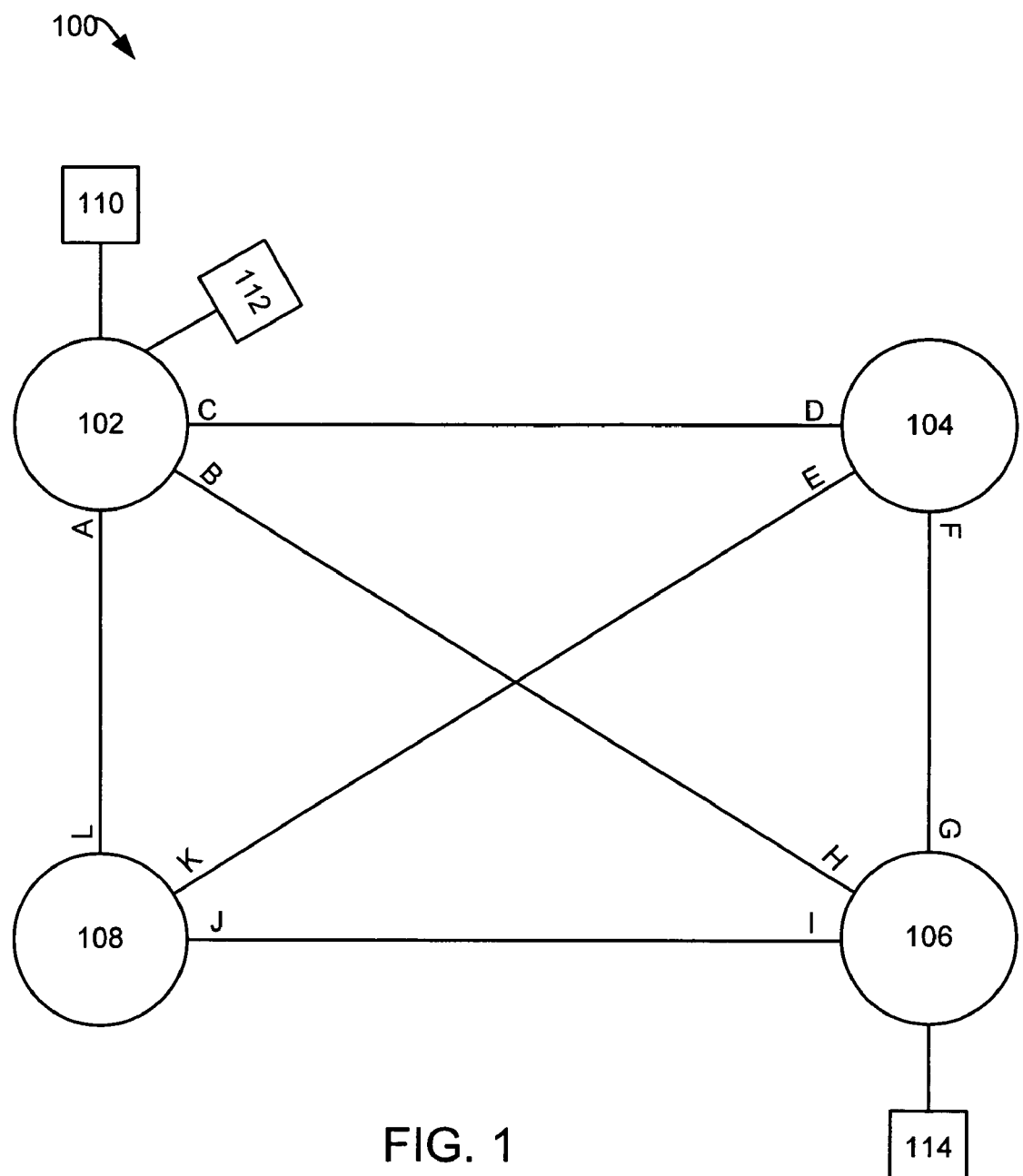
FIG. 1 shows a simple diagram of a mesh network.

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with embodiments of the present invention, there is provided a reverse spanning tree mesh network (RSTMN) designed to manage data packet traffic. Embodiments of the invention enable for the RSTMN to integrate software with current switch hardware to establish a network in which local switches are armed with the knowledge of the overall network topology. Further, RSTMN enables for each switch to maintain a link-state database which includes information about a plurality of available data paths to access node addresses (e.g., MAC addresses) of devices that may be attached to the network. With the RSTMN, switches may now accommodate for broken links, perform load balancing, and minimize the number of cost protocol packets to sets of select best paths.

Consider the situation wherein, for example, the RSTMN may include a plurality of switches which may be interconnected with one another. Also, attached to each switch may be a plurality of devices (e.g., computers, printers, scanners, etc.) with unique node addresses. Further, between any two switches there may be a plurality of ports from which data packets may be sent and received.

In an embodiment, each switch may store a topology map of the network on a link state database. Note that not all switches in the network may have or may be capable of storing a link state database. As discussed herein, a link state database refers to a database that stores data about the RSTMN. Data may include, but are not limited to, the switches on the network, the inbound and outbound ports associated with each switch, the available paths between two switches, the number of switches and ports between two switches, and the cost associated with each path. In an embodiment, each switch may send out topology inform packets to provide the data that may be stored in the link state database. As discussed herein, a topology inform packet refers to a data packet that may include specific information about the switch.

Equipped with the knowledge of the network topology, a switch may now create reverse spanning trees that may define a plurality of paths from which other switches may be able to forward packets. As discussed herein, a reverse spanning tree refers to a path or a set of paths that may include all switches without any looping paths (i.e., path(s) that may include a switch more than once). With a reverse spanning tree, the switch that defines a path is the destination switch instead of the source switch. In an example, switch A (source switch) sends data packets to switch B (destination switch). In the prior art, switch A may determine the path to send data packets to switch B. However, in a RSTMN, switch B may determine the path that switch A may employ to send data packets.

In an embodiment, the paths of each reverse spanning tree may include mesh links that may not be common to the paths of other reverse spanning trees. As discussed herein, a mesh link refers to a connection between ports of two neighboring switches. Reverse spanning trees may share common mesh links, but reverse spanning tress with unique paths that minimize mesh link overlapping may also minimize the number of invalid paths that may result from a broken link. Refer to Table 2 for an example.

In an embodiment, to create reverse spanning trees, a switch may send out path generation packets to the other switches in the network to establish a best unicast path for each specific node address. As discussed herein, a unicast path refers to a communication path between a single source switch to a single destination switch. In a unicast path, data packets may have to traverse through a plurality of switches before arriving at a destination switch. By employing path generation packets, each switch may be able to generate reverse spanning trees defining the best available paths to itself.

With a network topology map stored in each switch's link state database, each switch may now have the ability to perform load balancing. As discussed herein, load balancing refers to the ability to distribute network traffic among available paths. In an embodiment, each switch may be able to dynamically re-route a data packet if a link along a given path to a node address is broken. Further, by load balancing, each switch may now define paths on a node address (e.g., MAC addresses) level instead of at a switch level. Unlike the prior art, each switch may dynamically allocate different paths to the various node addresses associated with that switch instead of simply assigning one best path to newly learned node addresses between recalculation periods.

Also, during a recalculation period, the network may no longer be flooded by a plurality of cost protocol packets for all available paths. In an embodiment, cost protocol packets may be limited to the shortest paths, the lowest cost paths, and/or the user-selected paths. In this manner, bandwidth usage by cost protocol traffic may be greatly diminished.

Figure 2:
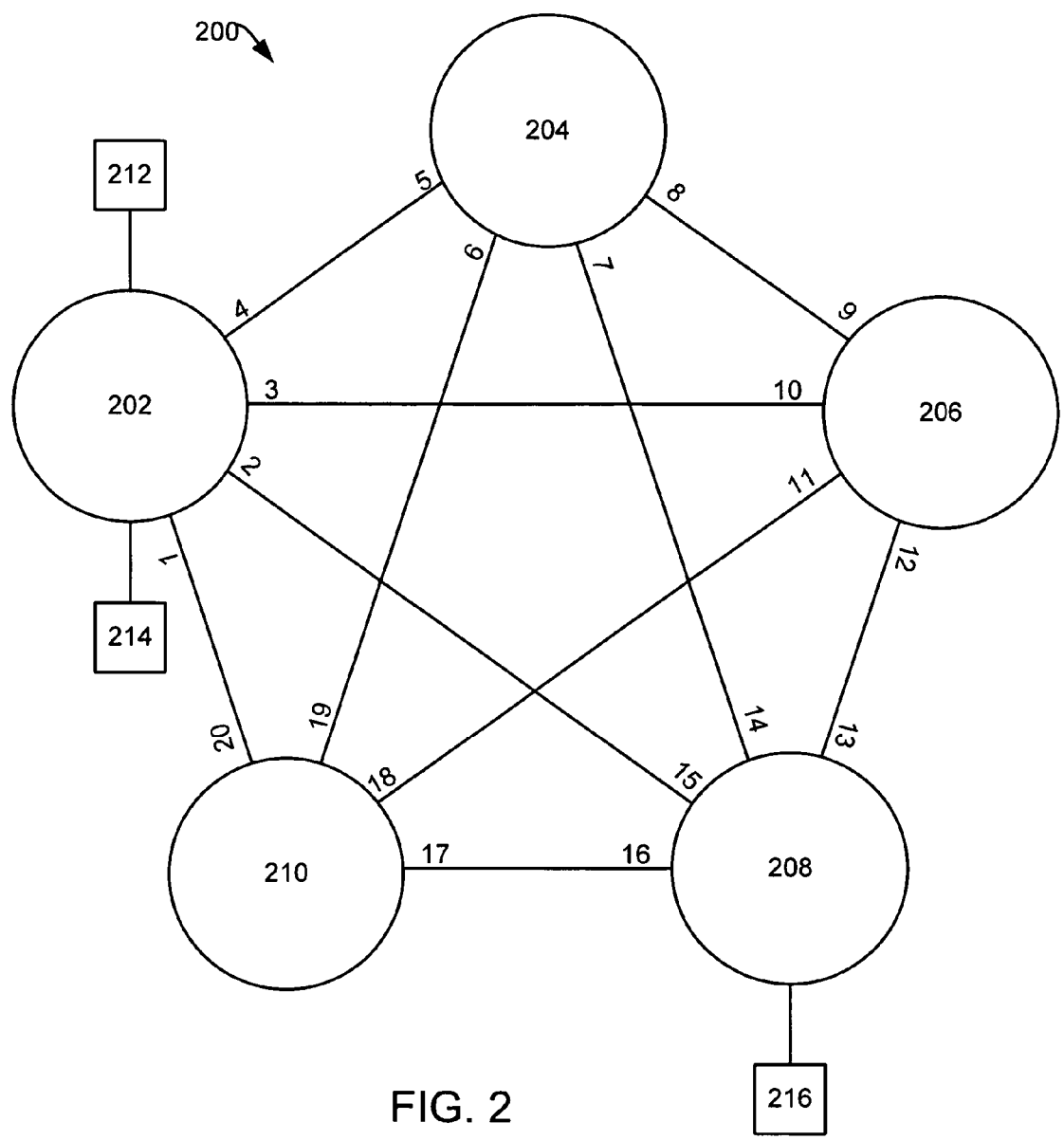
FIG. 2 shows, in an embodiment, a simple diagram of a reverse spanning tree meshing network.

The features and advantages of embodiments of the invention may be better understood with reference to the figures and discussions that follow. FIG. 2 shows, in an embodiment, a simple diagram of a reverse spanning tree meshing network (RSTMN). RSTMN 200 may have a plurality of switches (202, 204, 206, 208, and 210), which may be interconnected to one another. Attached to each switch may be a plurality of devices (e.g., computers, printers, scanners, etc.). In an example, devices (212 and 214) are attached to switch 202 and a device 216 may be attached to switch 208. Also, each switch may have a plurality of ports (1-20) from which a plurality of packets may be sent to neighboring switches. In an example, a packet may be sent from port 20 of switch 210 to port 1 of switch 202. Note that even though only one set of ports has been shown between two switches, multiple set of ports may exist between two switches.

Each switch in RSTMN 200 may have sufficient memory to maintain a link state database. However, it may be possible that one or more switches on the network may not have the capability of storing a link state database. As mentioned above, a link state database refers to a database that stores data about the network topology. Data may include, but may not be limited to, the switches on the network, the inbound and outbound ports associated with each switch, the available paths between two switches, the number of switches and ports between two switches, and the cost associated with each path. In essence, each switch may maintain a topology map of the entire network or a portion of the network. With the knowledge of the network topology, a switch may now create a reverse spanning tree that may define a plurality of non-looping paths (i.e., path(s) that include a switch only once) from which other switches may be able to forward data packets. In a reverse spanning tree, the switch that defines a path is the destination switch instead of the source switch.

Table 2 below shows, in an embodiment, examples of some of the reverse spanning trees that may exist for switch 202 based on the RSTMN in FIG. 2. As mentioned above, the number of common mesh links between reverse spanning trees may be minimized to limit the number of invalid paths when a mesh link is broken. In an example, reverse spanning tree 1 may include a mesh link between switch 210 and 202. If the mesh link (202←210) is ever broken, only reverse spanning tree 1 may become invalid, since none of the other reverse spanning trees (i.e., reverse spanning trees 2-6) include the broken mesh link.

TABLE 2

Examples of Reverse Spanning Trees

| Paths | Reverse Spanning Tree |
|---|---|
| 202<--204 | 1 |
| 202<--206 | |
| 202<--208 | |
| 202<--210 | |
| 202<--204 | 2 |
| 202<--206<--208<--210 | |
| 202<--204<--206<--208<--210 | 3 |
| 202<--206<--208 | 4 |
| 202<--204<--210 | |
| 202<--206 | 5 |
| 202<--204<--208<--210 | |
| 202<--204<--206 | 6 |
| 202<--208<--210 | |

However, consider the situation wherein, for example, a mesh link (i.e., 204→202) is broken. The reverse spanning trees 1-6 listed in the table above may all become invalid since the mesh link is included in all of the reverse spanning trees listed in Table 2. In order to minimize the impact of the broken mesh link, the mesh link (i.e., 204→202) may be remove from some of the reverse spanning trees. In an example, reverse spanning tree 3 may be altered to reflect path 202←206←208←210←204 instead of path 202←204←206←208←210. Thus, the number of mesh links common among the reverse spanning trees may vary depending upon the level of tolerance for the number of invalid reverse spanning trees that may result given a broken mesh link.

Figure 3:
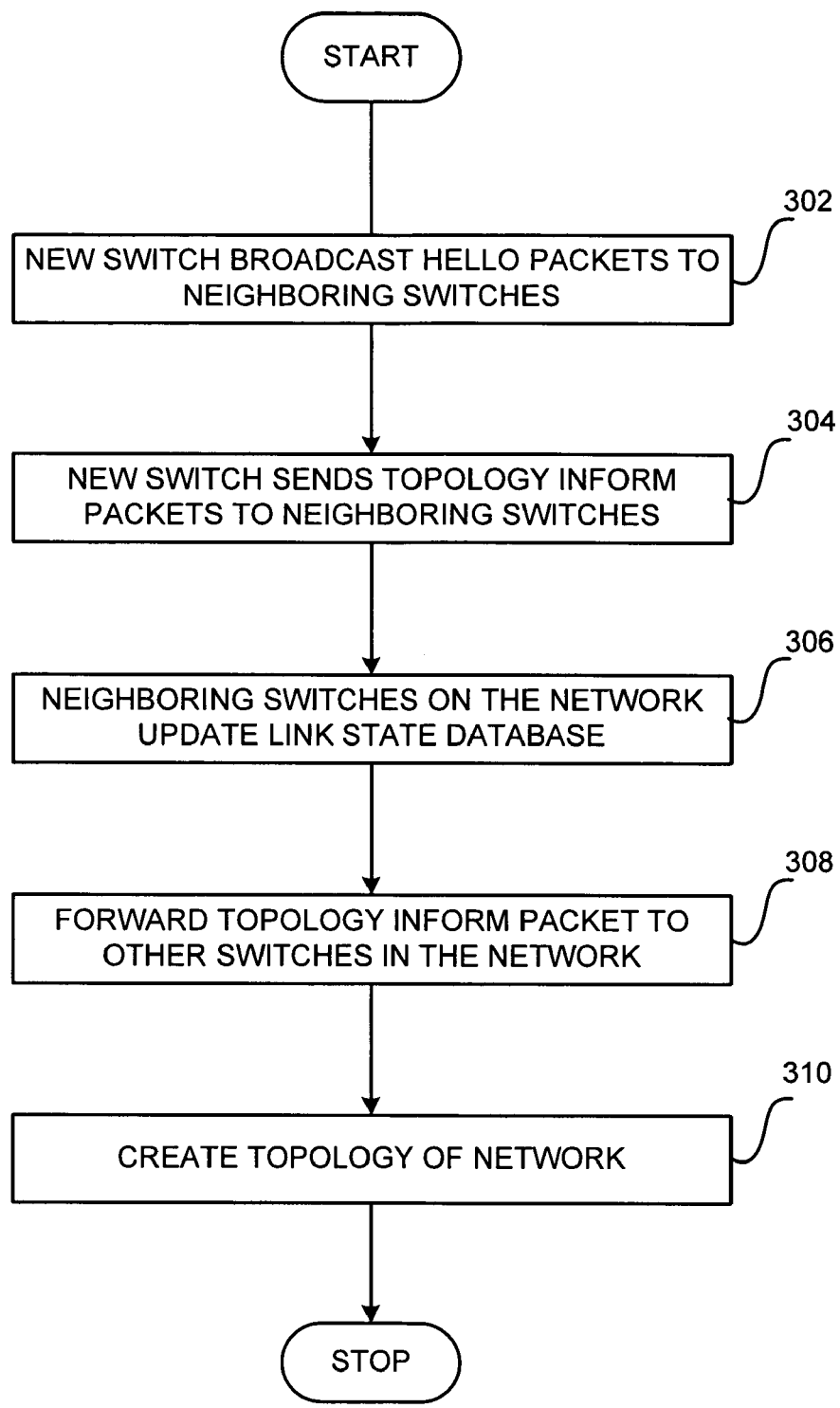
FIG. 3 shows, in an embodiment, a simple flowchart illustrating how a switch may build a topology map of the network.

FIG. 3 shows, in an embodiment, a simplified flowchart illustrating the steps for building a topology map of the network by a switch. FIG. 3 is discussed in relation to FIG. 2. At step 302, a new switch may broadcast hello packets to the network. As discussed herein, a hello packet refers to a data packet that allows a switch to announce itself to the other switches in the network. Also, hello packets may be capable of discovering and identifying neighboring switches. Consider the situation wherein, for example, switch 202 may be a new switch that may have recently been connected to RSTMN 200. To broadcast its existence to the other switches on the network, switch 202 may send out hello packets to the other switches in the network. The receiving switches, upon receiving the hello packets, may store the data locally.

At step 304, a topology inform packet may be transmitted from each of the new switch's ports to neighboring switches. As mentioned above, a topology inform packet refers to a data packet that may include specific information about the switch. A plurality of topology inform packets may be dispatched by a switch when a switch is first set up on a network. Each topology inform packet may include, but are not limited to, a switch identifier (i.e. an identifier that is unique to a switch), ports information about the switch, neighbor switches, ports associated with neighbor switches, and data about the mesh link between the switch and its neighbor switches.

In the above example, switch 202 may then send out topology inform packets to its neighboring switches (204, 206, 208, and 210) from each of its ports (4, 3, 2, and 1). Each of the topology inform packets may include a switch identifier. The switch identifier may be a unique identifier that may differentiate switch 202 from the other switches in the network. Also, each topology inform packet may include information about the ports (4, 3, 2, and 1) that switch 202 may have. Further, each topology inform packet may include data about how the neighboring switches (204, 206, 208, and 210) may be connected to switch 202. In an example, a mesh link from switch 202 to switch 210 may be from port 20 of switch 210 to port 1 of switch 202.

Once each of the topology inform packets has been received by the receiving switches (204, 206, 208, and 210), the receiving switches (204, 206, 208, and 210) may update their link state databases with the information from the topology inform packets sent by switch 202 (step 306). The receiving switches may then forward the topology inform packets to other neighboring switches (step 308). In an embodiment, a mechanism may be employed to prevent each topology inform packet from looping (i.e., being viewed more than once by a switch) within the network. In an example, once a switch has viewed a topology inform packet, the switch may append its switch identifier to the topology inform packet and forward the topology inform packet to the neighboring switches that may have not seen the particular topology inform packet.

Consider the situation wherein, for example, switch 202 sends a topology inform packet to switch 210. Before forwarding the topology inform packet, switch 210 may check to see which switches may have already seen the topology inform packet. Since only the switch identifier for switch 202 has been added to the topology inform packet, switch 210 may update the data packet to add its own switch identifier before forwarding the topology inform packet to its neighboring switches (e.g., 204, 206, and 208), excluding switch 202. Once the switches in the network have seen each of the topology inform packets, then each switch now have the data to create a topology of the network (step 310).

With a topology of the network, each switch may now have the ability to create reverse spanning trees, which may include a plurality of best unicast paths. Refer back to Table 2 to see examples of reverse spanning trees that each switch may create to define unicast paths back to itself. As mentioned above, a unicast path refers to a communication path between a single source switch to a single destination switch. In a unicast path, data packets may have to traverse through a plurality of switches before arriving at a destination switch.

Figure 4:
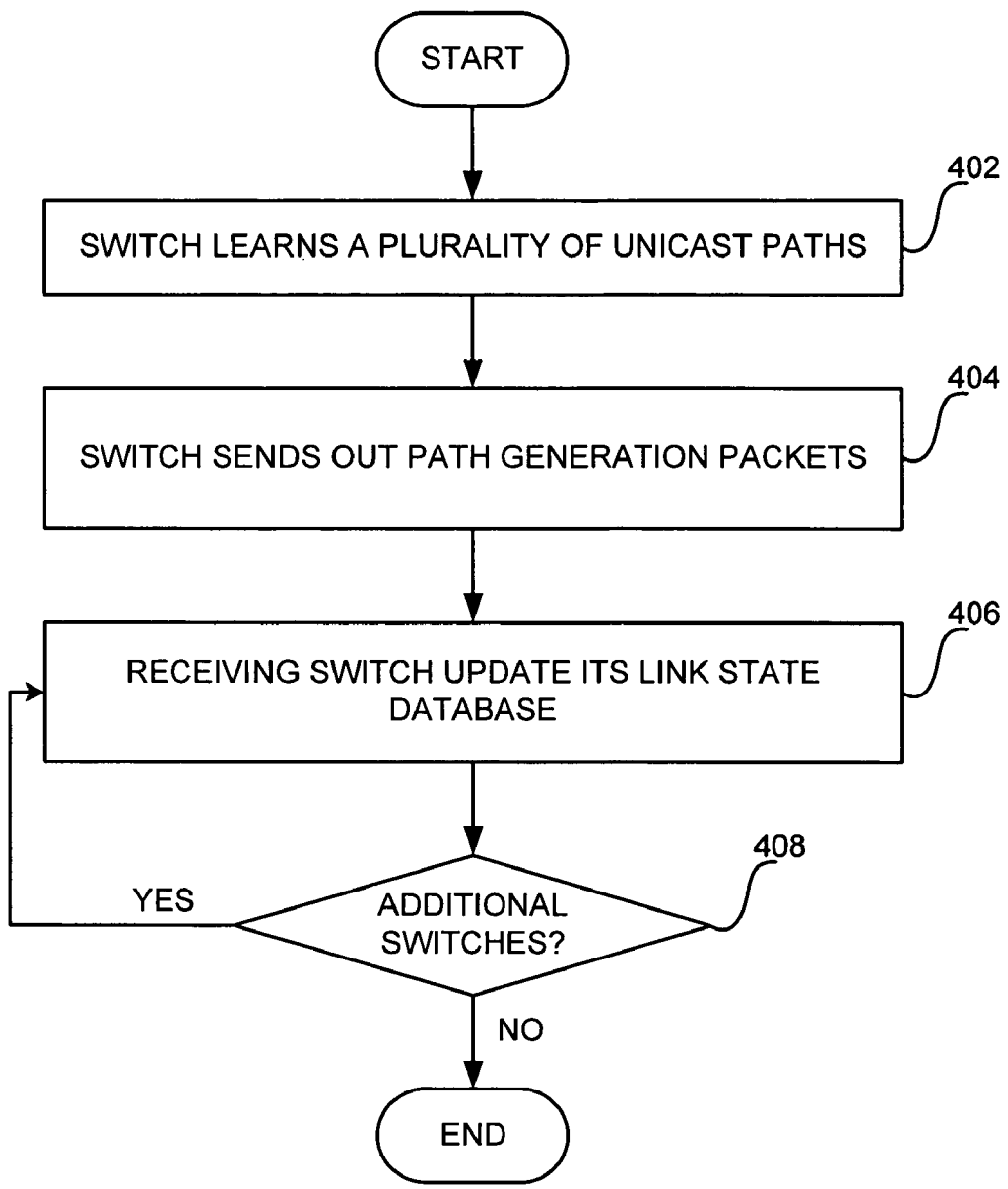
FIG. 4 shows, in an embodiment, a simple flow chart illustrating the steps a switch may employ to share with the other switches a plurality of unicast paths back to itself.

FIG. 4 shows, in an embodiment, a simplified flow chart representing the steps a switch may employ for sharing a plurality of unicast paths (i.e., one or more unicast paths) to other switches in the network, back to the original switch. FIG. 4 is discussed in relation to FIG. 2 and Table 2. At step 402, the switch may send out path generation packets for new unicast paths learned by a switch. Consider the situation wherein, for example, switch 202 creates six reverse spanning trees (as shown in Table 2 above) for navigating data packets through the network to itself At step 404, the destination switch (switch 202) may, out of its ports, send a plurality of path generation packets to each of the source switches along the identified unicast paths. In an example, switch 202 may send out to the other switches one or more path generation packets for reverse spanning tree 3 that may include, but are not limited to, the source switch identifier (switch 210), the destination switch identifier (switch 202), the path identifier, switch identifiers for the other switches (switches 204, 206, and 208), and port data for each of the switches. As discussed herein, a path identifier is a unique identifier that differentiates the various paths.

Upon receipt of a path generation packet, each receiving switch may update its link state database with the data contained in the path generation packet. The receiving switch may forward the path generation packet to the next switch located on the unicast path. Steps 406 and 408 may be repeated until each path generation packet has traversed the entire unicast path. By dispatching path generation packets to the switches situated on the unicast paths, each switch may be capable of generating reverse spanning trees to define the best available paths to itself.

In addition, each switch, with the knowledge of the network topology, may now have the ability to dynamically define the paths based on the node addresses (e.g., MAC addresses) instead of just by the switch. In an example, a switch may have five node addresses associated with it. In the prior art, there may be only one best path for data packets sent between a source switch and a destination switch between recalculation periods. However, by having a topology map available, each switch may perform load balancing by dynamically associating different best paths to the various node addresses associated with that switch. Thereby, packet traffic may be disbursed among the various paths instead of being limited to a best path for each switch between recalculation periods.

Note that load balancing may occur with or without human intervention. In an embodiment, a human operator may have the ability to define what type of traffic may be sent along a certain path. In an example, an internet phone and a computer may be both attached to switch 202. Likewise, an internet phone and a computer may also be attached to switch 208. A human operator may define that all voice over internet phone (VOIP) traffic between the two phones may be directed through a first path (port 3→port 10→port 12→port 13) while all email traffic between the two computers may be sent through a second path (port 2→port 15). Thus, data packet traffic may not only be disbursed based on cost but may also be based on other factors, including human intervention.

Figure 5:
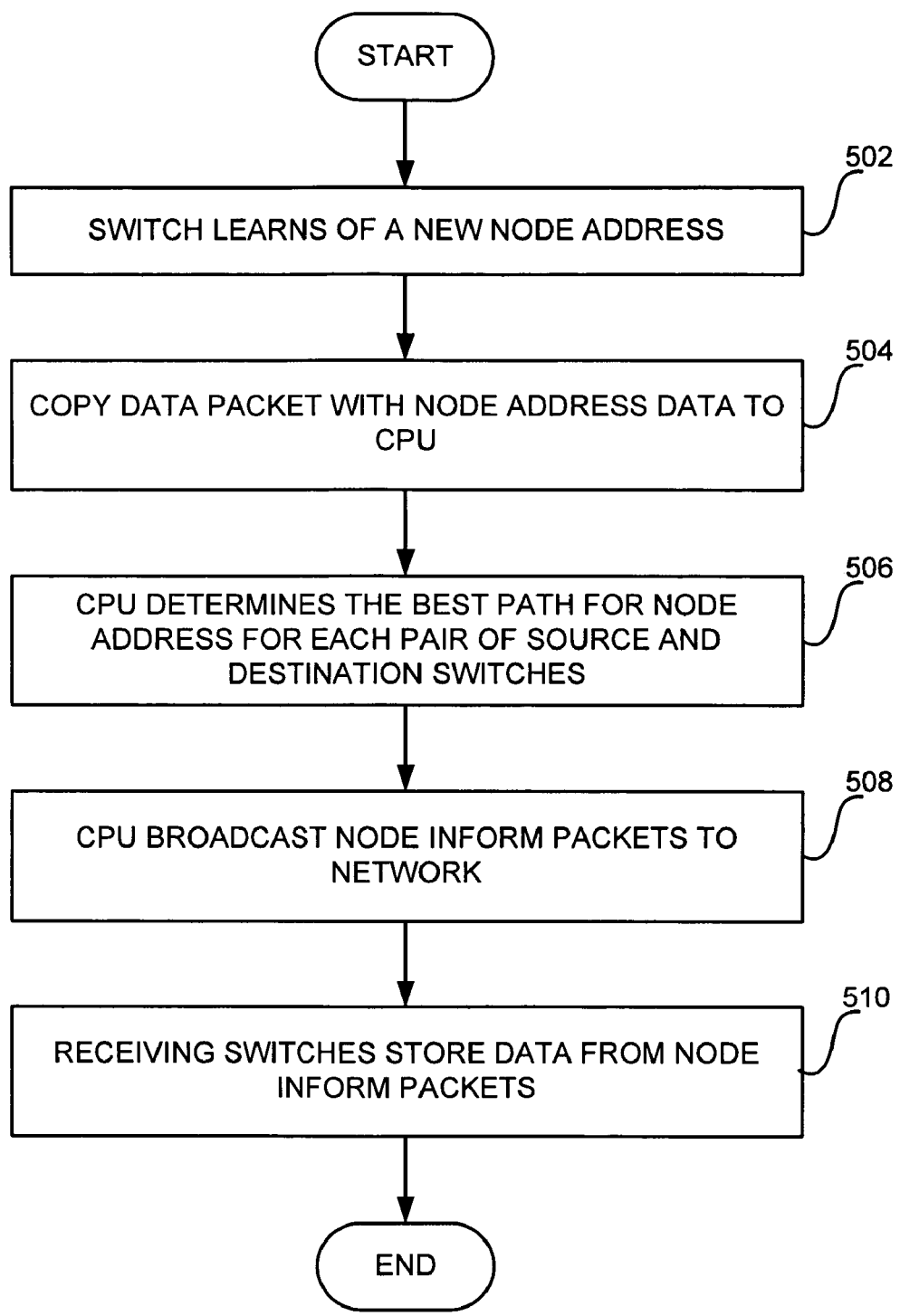
FIG. 5 shows, in an embodiment, a simple flow chart diagramming the steps for updating the network with a new node address.

If a new node address is added to a switch, then the switch may need to inform the rest of the network. FIG. 5 shows, in an embodiment, a simple flow chart diagramming the steps for updating the network with a new node address. At step 502, a switch may learn of a new node address. Consider the situation wherein, for example, a switch receives a data packet with a node address that is not currently identified in its link state database. In an embodiment, to inform the rest of the network of the new node address, the switch may copy the data packet to the CPU (step 504). At step 506, the CPU may determine the best path for the new node address for each pair of source switch and destination switches. At step 508, the CPU may broadcast node inform packets with path identifiers to the rest of the network. At step 510, each switch upon receiving a node inform packet may store the data (e.g., the new node address, its related switch, its best path, etc.).

Unlike the prior art, new node addresses that are activated on the network between recalculation periods may not be all assigned to the current best path of a pair of source and destination switches as identified by a destination switch. Instead, each new node address may be associated with a different best path. In an example, if 10 new node addresses have been learned by a particular switch, then the switch may assign a different path to each of the node addresses. In other words, the switch may now perform load balancing (i.e., distributing packet traffic between the available paths).

With a reverse spanning tree, switches on the RSTMN may now be able to send packets along pre-defined paths. If a mesh link along a given path to a node address fails and/or may be experiencing reduced throughput, the switches in the path may now able to dynamically re-route data packets since each switch has the knowledge of the network topology, in an embodiment. Also, each switch may inform the other switches which reverse spanning trees may be broken given the failed mesh link. The other switches, which may be sourcing data packet traffic, may then be able to reassign MAC addresses associated with the broken reverse spanning trees with other reverse spanning trees. Further, the root switches (i.e., switches that may have received data packets via the failed mesh links) may construct new reverse spanning trees to replace the broken reverse spanning trees. Unlike the prior art, the reassignment of the MAC addresses may be done outside of the recalculation period.

Figure 6:
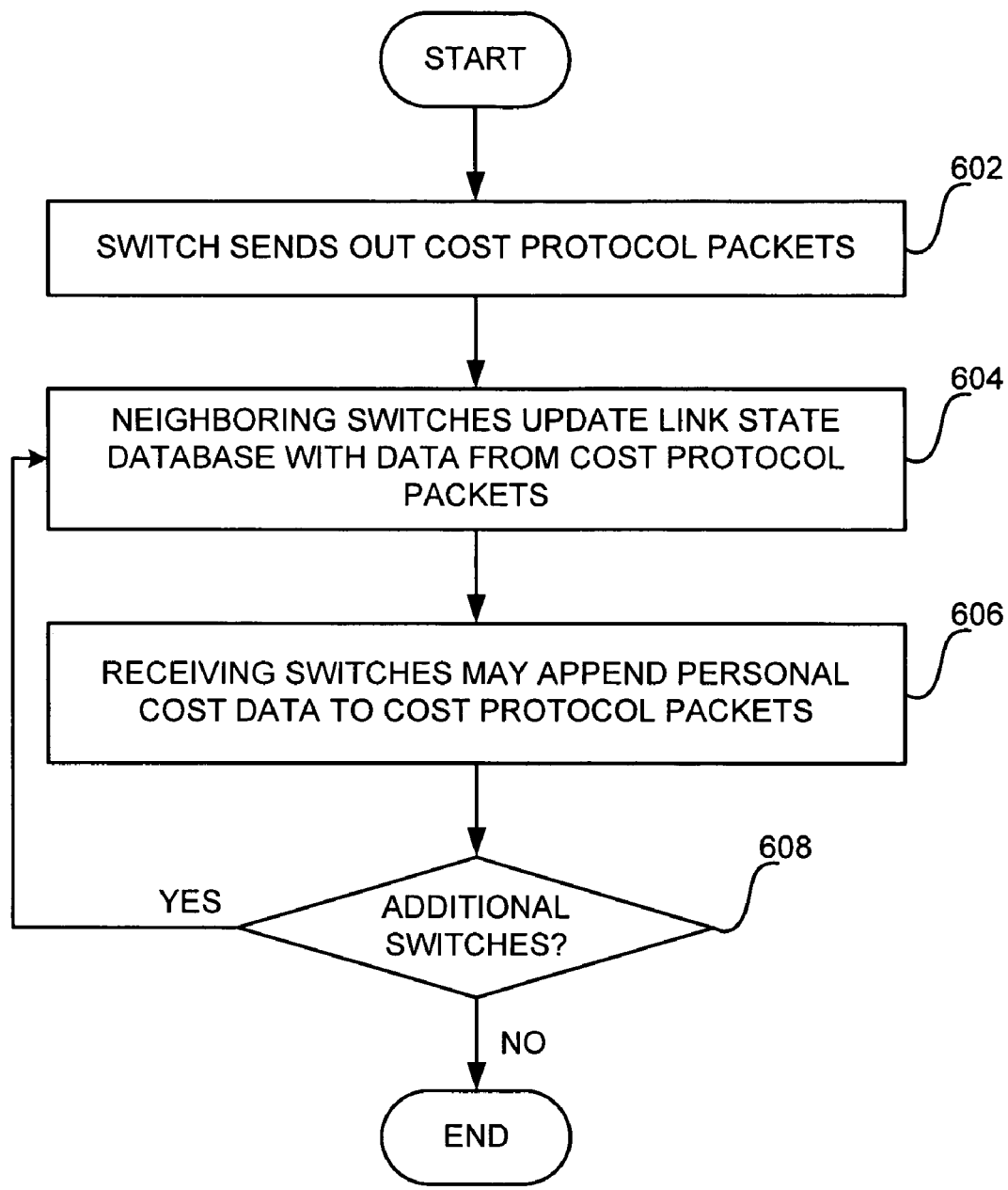
FIG. 6 shows, in an embodiment, a simple flow chart illustrating the steps for determining the cost for each of the links in the reverse spanning tree mesh network.

FIG. 6 shows, in an embodiment, a simple flow chart illustrating the steps used in determining the cost associated with each of the links in the RSTMN. FIG. 6 is discussed in relation to FIG. 2. At step 602, each switch may send out of each of its ports cost protocol packets. Initially, the data in a cost protocol packet may include, but are not limited to, a switch identifier of the sending switch and the cost associated with the port that may be sending the cost protocol packet. In an example, switch 202 may send out cost protocol packets to neighboring switches. The cost protocol packet that may be sent to switch 204 may include not only the switch identifier unique to switch 202, but may also include cost data about port 4. Likewise, the cost protocol packets that may be sent to switches 206, 208, and 210 may include cost data about port 3, port 2, and port 1, respectively.

At step 604, each receiving switch may update its link state database with the data included in the cost protocol packet. The receiving switch may add data to the cost protocol packet at step 606. Data may include, but are not limited to, the switch identifier of the receiving switch, the inbound port number, the cost of the inbound port, and the cost of the outbound port number. In an example, switch 204 may have updated its link state database with the data from a cost protocol packet originating from switch 202. Switch 204 may append data, such as the switch identifier unique to switch 204, the inbound port number (port 5) and the cost associated with port 5, and the cost associated with outbound port 8 (if, for example, the cost protocol packet is to be forwarded to switch 206 from switch 204) to the cost protocol packet.

The current receiving switch may forward from each of its ports the appended cost protocol packets to any other additional switches at step 608. In an embodiment, the cost protocol packets may only be dispatched to switches that have not seen the cost protocol packets. The current switch may be able to make this determination by examining the switch identifiers information that may be stored in the cost protocol packets. Steps 604 to 608 may be repeated until each switch has updated its link state database with the data contained in the cost protocol packets.

In an embodiment, cost protocol packets may not be dispatched to all available paths. In the prior art, at each recalculation period, the network may be flooded with a multitude of cost protocol packets as cost of each available paths are recalculated, regardless of its utilization status. Instead, with the RSTMN, the human operators may determine the types and number of cost protocol packets that may be sent. In an embodiment, cost protocol packets may be sent out for high traffic paths. In another embodiment, cost protocol packets may be sent out for user-selected paths. As a result, the amount of bandwidth that may be dedicated to cost protocol traffic may greatly reduce.

As can be appreciated from embodiments of the invention, the RSTMN augments switches capability by empowering switches with the ability to dynamically respond to ever-changing network conditions. Also, with the RSTMN, cost control can be implemented through load balancing and by managing the number of cost protocol packets. Further, the present invention is backward compatible and does not impose a requirement for the user to allocate additional resources to enjoy the benefits of the RSTMN.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a packet-based switch, a method for managing data flow between said switch and other switches that are interconnected in a mesh network, comprising:

receiving at said switch a topology inform packet sent from a first switch of said other switches, said topology inform packet including at least an identifier of said first switch;

at said switch, updating a link state database associated with said first switch, said link state database being configured for storing topology data pertaining to said mesh network;

forwarding said topology inform packet to at least another switch of said other switches to enable said at least another switch to update a link state database associated with said at least another switch; and at said switch, creating a reverse spanning tree, said reverse spanning tree being created with said switch being designated a destination switch and configured to provide information pertaining to a plurality of possible paths to said switch from a given switch of said other switches.

2. The method of claim 1 wherein said mesh network represents a packet-based network.

3. The method of claim 1 wherein said topology inform packet further includes port information pertaining to said first switch.

4. The method of claim 1 further comprising modifying said topology inform packet prior to said forwarding, said modifying includes adding information to said topology inform packet to inform said at least another switch that said switch has already received topology inform data from said first switch.

5. The method of claim 1 further comprising ascertaining whether said at least another switch has already received topology inform data from said first switch prior to said forwarding.

6. The method of claim 5 wherein said ascertaining includes detecting whether said at least another switch has already added information to said topology inform packet to signify that said at least another switch has already received said topology inform data from said first switch.

7. The method of claim 1 wherein said creating said reverse spanning tree includes sending a path generation packet from said switch, said path generation packet including at least an identifier for said switch and an identifier for said given switch.

8. The method of claim 7 wherein said path generation packet further includes a unique path identifier.

9. The method of claim 1 further comprising dynamically balancing traffic that traverses said switch, said dynamically balancing utilizing said topology data stored in said link state database associated with said switch.

10. The method of claim 9 wherein said dynamically balancing involves utilizing load balancing criteria provided by a human operator.

11. The method of claim 1 further comprising: at said switch, dynamically routing second packets pertaining to a data flow onto a second path if a first path on which first packets pertaining to said data flow experiences reduced throughput.

12. The method of claim 1 further comprising: at said switch, calculating cost data pertaining to paths traversing said switch, said calculating utilizing said topology data stored in said link state database associated with said switch.

13. A method for managing data flow between a plurality of switches in a packet-based network, said plurality of switches being interconnected in a mesh topology, comprising:

sending, using a first switch, a topology inform packet that includes at least an identifier of said first switch;

updating at the plurality of switches, using data in said topology inform packet, link state databases associated with respective ones of said plurality of switches; and at the plurality of switches, creating reverse spanning trees utilizing said link state databases, a reverse spanning tree associated with a given switch of said plurality of switches being created with said given switch being designated a destination switch and configured to provide information pertaining to a plurality of possible paths to said given switch from another switch of said plurality of switches.

14. The method of claim 13 wherein said creating said reverse spanning tree includes sending path generation packets from said plurality of switches, a path generation packet sent from said given switch including at least an identifier for said given switch and an identifier for said another switch.

15. The method of claim 13 wherein said path generation packet sent from said given switch further includes a unique path identifier.

16. The method of claim 13 further comprising: at a given switch, dynamically balancing traffic that traverses said given switch, said dynamically balancing involves utilizing said topology data stored in a link state database of said given switch.

17. The method of claim 16 wherein said dynamically balancing involves utilizing load balancing criteria provided by a human operator.

18. The method of claim 13 further comprising: at a given switch, dynamically routing second packets pertaining to a data flow onto a second path if a first path on which first packets pertaining to said data flow experiences reduced throughput, said second packets and said first packets traversing said given switch.

19. The method of claim 13 wherein said first switch represents a switch that is recently added to said network.

20. A computer readable storage medium on which is embedded one or more computer programs, said one or more computer programs implementing a method of managing data flow between a switch and other switches that are interconnected in a mesh network, said one or more computer programs comprising computer readable code for:

receiving at said switch a topology inform packet sent from a first switch of said other switches, said topology inform packet including at least an identifier of said first switch;

updating a link state database associated with said first switch, said link state database being configured for storing topology data pertaining to said mesh network;

forwarding said topology inform packet to at least another switch of said other switches to enable said at least another switch to update a link state database associated with said at least another switch; and creating a reverse spanning tree, said reverse spanning tree being created with said switch being designated a destination switch and configured to provide information pertaining to a plurality of possible paths to said switch from a given switch of said other switches.

21. The computer readable storage medium according to claim 20, wherein said topology inform packet further includes port information pertaining to said first switch.

22. The computer readable storage medium according to claim 20, further comprising computer readable code for:

modifying said topology inform packet prior to said forwarding, said modifying includes adding information to said topology inform packet to inform said at least another switch that said switch has already received topology inform data from said first switch.

\* \* \* \* \*